(12) United States Patent
Dolgoff

(10) Patent No.: US 9,689,647 B1
(45) Date of Patent: Jun. 27, 2017

(54) TARGET STAND

(71) Applicant: Todd Ian Dolgoff, Santa Cruz, CA (US)

(72) Inventor: Todd Ian Dolgoff, Santa Cruz, CA (US)

( * ) Notice: Subject to any disclaimer, the term of this patent is extended or adjusted under 35 U.S.C. 154(b) by 0 days.

(21) Appl. No.: 15/182,277

(22) Filed: Jun. 14, 2016

(51) Int. Cl.
    *F41J 1/10*     (2006.01)
    *F16B 47/00*     (2006.01)
    *G09F 15/00*     (2006.01)

(52) U.S. Cl.
CPC ............... *F41J 1/10* (2013.01); *F16B 47/003* (2013.01); *G09F 15/0062* (2013.01)

(58) Field of Classification Search
CPC ............ G09F 15/0056; G09F 15/0062; G09F 15/0037; F41J 1/00; F41J 1/10
USPC ...... 273/403–410; 40/607.02, 607.04, 607.1, 40/610
See application file for complete search history.

(56) References Cited

U.S. PATENT DOCUMENTS

| | | | |
|---|---|---|---|
| 2,691,526 A | 10/1954 | Wesley et al. | |
| 3,088,738 A | 5/1963 | Meyer | |
| 3,415,519 A * | 12/1968 | Hand ........................ | F41J 1/10 248/170 |
| 3,583,466 A * | 6/1971 | Dreyer ................... | G03B 21/58 160/351 |
| 4,029,318 A | 6/1977 | Boss | |
| 4,108,311 A * | 8/1978 | McClendon ........... | B60Q 7/005 116/173 |
| 4,115,937 A * | 9/1978 | Wolpert ................... | G09F 5/00 40/606.18 |
| 4,329,800 A * | 5/1982 | Shuman .................. | F16B 7/105 40/606.14 |
| 4,726,593 A * | 2/1988 | Wade ......................... | F41J 1/10 273/392 |
| 4,884,658 A * | 12/1989 | Banfield .................. | B25H 1/06 182/129 |
| 4,913,389 A | 4/1990 | McCracken | |
| 5,209,492 A | 5/1993 | Hamilton | |
| 5,211,288 A * | 5/1993 | Beall ........................ | G09F 5/04 190/109 |
| 5,280,920 A | 1/1994 | Knapper, II | |
| 5,671,924 A | 9/1997 | Scott | |
| 5,967,523 A | 10/1999 | Brownlee | |
| 6,105,292 A * | 8/2000 | Current ............... | G09F 15/0068 40/605 |

(Continued)

OTHER PUBLICATIONS

Re-Nine Safety Disposable Safety Cones and Target Cones | Products; http://www.re-nine.com/; printed: May 25, 2016 (1page).

*Primary Examiner* — Mark Graham
(74) *Attorney, Agent, or Firm* — Vista IP Law Group LLP

(57) ABSTRACT

A target stand includes right and left T-bar legs, corresponding right and left uprights with inwardly-facing grooves, and a base. Horizontal portions of the T-bar legs are removably secured to the base. Vertical portions of the T-bar legs have inwardly-facing grooves coinciding with the inwardly-facing grooves of the uprights, such that together they form substantially continuous inwardly-facing right and left grooves to receive and secure a target. Components of the target stand are sized and shaped to fit compactly in a container having a top and bottom which may serve as the base individually or together.

20 Claims, 14 Drawing Sheets

(56) References Cited

U.S. PATENT DOCUMENTS

| | | | | |
|---|---|---|---|---|
| 6,115,951 A * | 9/2000 | Jing | ............... | B60Q 7/00 |
| | | | | 116/63 P |
| 6,491,303 B1 * | 12/2002 | Huston | ............... | F41J 1/10 |
| | | | | 273/407 |
| 7,434,810 B2 * | 10/2008 | DeMille | ............... | A63F 9/0204 |
| | | | | 273/403 |
| 7,726,657 B2 | 6/2010 | Shalosky | | |
| 7,797,869 B2 * | 9/2010 | Tollis | ............... | G09F 7/00 |
| | | | | 248/156 |
| 7,866,074 B2 * | 1/2011 | McComb | ............... | B43K 23/001 |
| | | | | 160/135 |
| 8,176,665 B2 | 5/2012 | Petrovic | | |
| 8,770,587 B2 | 7/2014 | Diercks | | |
| 8,955,846 B2 | 2/2015 | Frickey | | |
| 2003/0168813 A1 * | 9/2003 | Wilkus | ............... | F41J 1/10 |
| | | | | 273/407 |
| 2010/0031546 A1 * | 2/2010 | Nwatu | ............... | G09F 15/0062 |
| | | | | 40/607.1 |
| 2011/0074112 A1 * | 3/2011 | Allen | ............... | F41J 1/10 |
| | | | | 273/407 |
| 2011/0175294 A1 * | 7/2011 | Amodt | ............... | F41J 1/10 |
| | | | | 273/407 |
| 2015/0292842 A1 * | 10/2015 | Pixton | ............... | F41J 1/10 |
| | | | | 273/407 |

* cited by examiner

TARGET STAND

FIELD OF THE INVENTION

The present invention relates generally to target practice, and more particularly to a portable, lightweight target stand.

BACKGROUND

Gun enthusiasts and professionals such as law enforcement and military personnel often engage in target practice as part of their hobby and/or training. Indoor and outdoor shooting ranges exist with man-made targets and/or target-stabilizing equipment. However, shooters often engage in target practice in other areas, such as on government-owned land authorized for such use, or private property, where no man-made targets or related equipment exists. Thus, the shooters bring their own target stands with related tools and accessories, and assemble and/or set up the targets themselves.

One type of such prior art target stand (1a) includes a fixed metal base (2) as shown in FIG. 1A. This type of stand (1a) is bulky, awkward-shaped, relatively heavy, and can damage the inside of a transport vehicle by scraping and/or denting. This type of stand (1a) also requires extra pieces such as wooden stakes (3), and tools such as a hammer to drive the stakes (3) into the vertical metal posts (4) of the base (2). Further, paper or cardboard targets (5) must then typically be secured to the wooden stakes (3) with staples (6) or the like, requiring additional tools and assembly. Finally, this type of target stand (1a) is not very stable in even mild wind conditions even if rocks (7) or weights are placed on the base (2), because the rocks (7) or weights tend to fall off the base (2) during target impact or simply due to wind or human intervention when handling the target (5).

Another type of prior art target stand (1b) includes metal stakes (8) as shown in FIG. 1B. This type of stand (1b) is less bulky, but it also relatively heavy and can damage the inside of a transport vehicle by scraping and/or denting. This type of stand (1b) also requires extra pieces such as wooden stakes (3), and tools such as a hammer to drive the wooden stakes (3) through sleeves (9) in the vertical metal stakes (8) and into the ground (10). And similar to target stand (1a), paper or cardboard targets (5) must then typically be stapled to the wooden stakes (3), requiring additional tools and assembly. This type of target stand (1b) is not very practical in areas where the ground (10) is hard, such as hard dirt, stone, or gravel.

Other known target stands suffer from similar and/or other inconveniences and burdens. Therefore, a need exists for a lightweight, small profile target stand that is stable, durable, and is easy to transport, use, assemble, and disassemble.

SUMMARY

The present invention relates to a target stand. In one embodiment, the target stand includes right and left T-bar legs, segmented corresponding right and left uprights with inwardly-facing grooves, and a base. Horizontal portions of the T-bar legs are removably secured to the base. Vertical portions of the T-bar legs have inwardly-facing grooves coinciding with the inwardly-facing grooves of the uprights, such that together they form substantially continuous inwardly-facing right and left grooves to receive and secure a target. In one embodiment, the target stand components are made of COROPLAST or other corrugated plastic, and are shaped and packaged to form a lightweight and compact kit for easy transport and storage.

In another embodiment, multiple target stands are positioned adjacent each other and daisy-chained together in a line such that multiple targets may be set up across a shooter's field of view. For example, in this embodiment with just two target stands, the groove of a right upright of the first target stand would be outwardly-facing, as would the groove of a left upright of the second adjacent target stand to the right of the first target stand, both uprights being at the same relative location/height. In this manner, a target could be secured in those grooves at that height, i.e., the left side of the target would be secured in the outwardly-facing groove of the first target stand, and the right side of the target would be secured in the outwardly-facing groove of the second target stand. The first target stand and the second target stand could each have their own additional targets secured within their own respective inwardly-facing grooves formed by other uprights. In this example, there would be a total of three targets available for shooting, and they would be at two (or three) different heights. Similarly, for each additional target stand daisy-chained to the next, two more targets could be added—one secured at a first height in the inwardly-facing grooves of the newly-added target stand, and one secured at a second height in one outwardly-facing groove of the newly-added target stand and one outwardly-facing groove of the target stand adjacent the newly-added target stand.

In one aspect of the invention, the target stand includes a base having a floor and raised edges, right and left T-bar legs, and a plurality of right and left uprights. The T-bar legs each have a horizontal component with a cutout, and a vertical component positioned in the cutout and secured to the horizontal component. The horizontal components are removably secured to the base. The vertical components have inwardly-facing grooves and dual-channel open tops. The uprights have inwardly-facing grooves, dual-channel open tops, and couplers secured to the bottom to mate with the dual-channel open top of the lower vertical component or a lower upright, with all corresponding grooves coinciding to form opposing left and right substantially continuous inwardly-facing grooves for securing a target.

In another aspect of the invention, the target stand includes stiffener brackets secured to inner walls of the horizontal components of the T-bar legs adjacent the cutouts, and the vertical components of the T-bar legs are secured to the corresponding horizontal components at least in part by the corresponding stiffener brackets.

In another aspect of the invention, the horizontal components of the T-bar legs are removably secured to the base at the floor and at the raised edges with fastening tape.

In another aspect of the invention, the base, the horizontal components of the T-bar legs, and a cover have anchor holes therein such that corresponding holes are aligned for receiving a peg or stake therethrough to help secure the target stand to a stable surface such as the ground.

In another aspect of the invention, the mating portions of the couplers are curved, to assist in insertion of the couplers into the dual channel open tops of the uprights or vertical components of the T-bar legs.

In another aspect of the invention, the target stand includes braces secured between the joints of the T-bar legs to provide additional stability.

In another aspect of the invention, the components are formed from patterns and are made of corrugated plastic, shaped and held together as needed by glue or welding (e.g., ultrasonic, hot plate, laser/infrared, RF, and/or implant) as is known in the art.

In another aspect of the invention, the components are sized and shaped to fit compactly in a container formed by the base and a cover. For example, the base and cover may be square-shaped or rectangular-shaped to form a relatively flat box, with the remaining components fitting inside. In one embodiment, the T-bar legs are arranged with their horizontal components abutting against opposing edges of the container, offset to allow the inwardly-extending vertical components to abut each other. The uprights are arranged side by side, each extending in the same direction as the vertical components of the T-bar legs, with longer uprights at the outer edges of the container, and shorter uprights extending from the inwardly-facing surface of the horizontal component of one T-bar leg to the inwardly-facing surface of the horizontal component of the other T-bar leg. This results in a relatively flat platform surface on which targets may be placed for packaging, shipment, and storage. Fastening tape on the T-bar legs and the base used to removably secure the T-bar legs to the base when the target stand is fully-assembled, may also be used to removably secure the T-bar legs to the base when packaged as described above for storage or shipment.

These and other embodiments and aspects of the invention are described more fully herein, with reference to the drawings.

DRAWINGS

DETAILED DESCRIPTION

The present invention relates to a target stand (50). Some benefits of the target stand (50) are that it is lightweight, sturdy, easy to assemble/disassemble, has a compact profile for storage and shipping, allows for varying heights, and does not cause ricochets. COROPLAST or other corrugated plastic is the preferred material of all the components of the target stand (50) other than fastening tape (60). Such material has the added benefit of being weather resistant. However, other materials such as cardboard, and/or other thermoplastics may be used as well.

Figure 4:
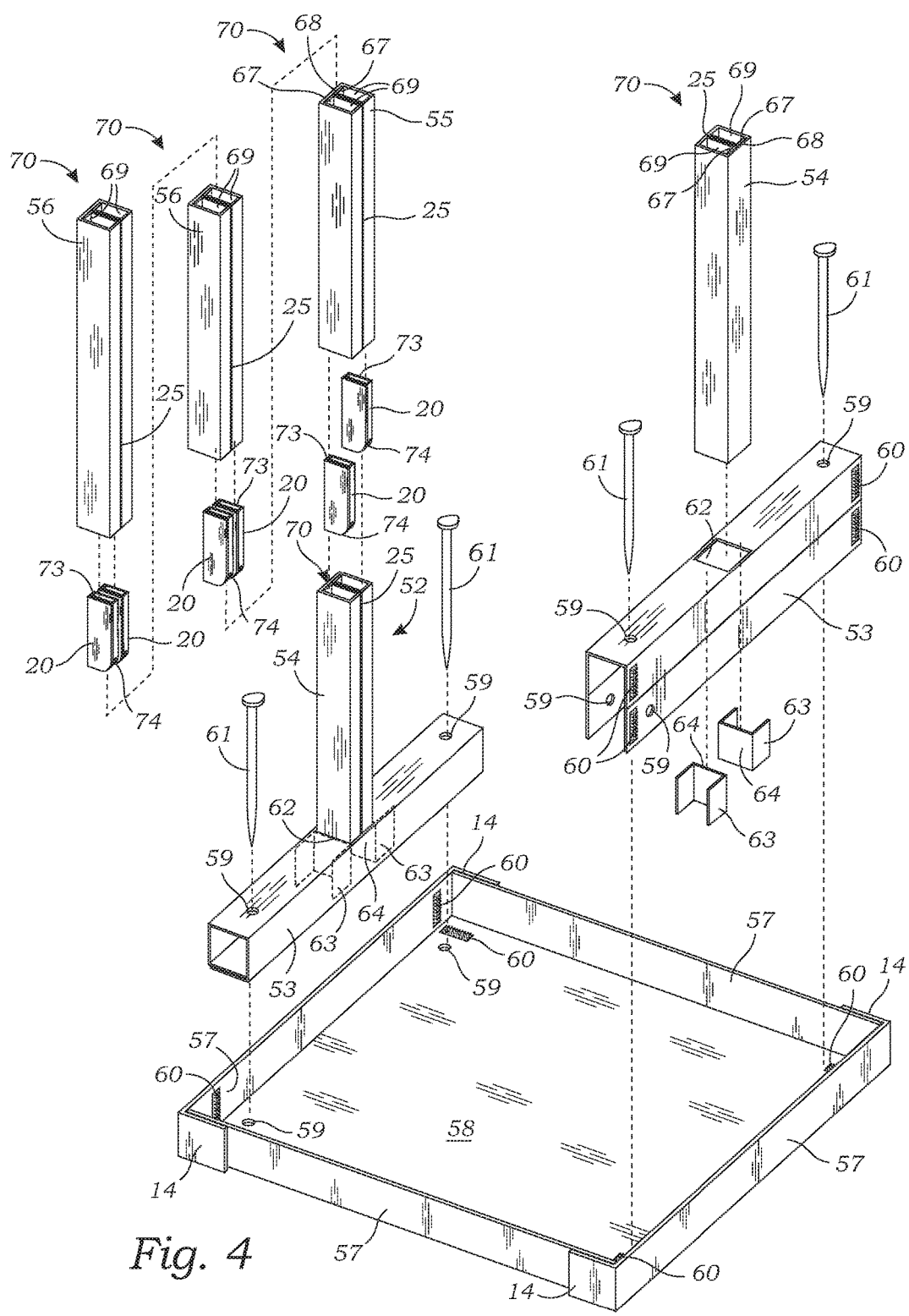
FIG. 4 is an exploded view of the components of the target stand kit of FIG. 3.
Figure 5:
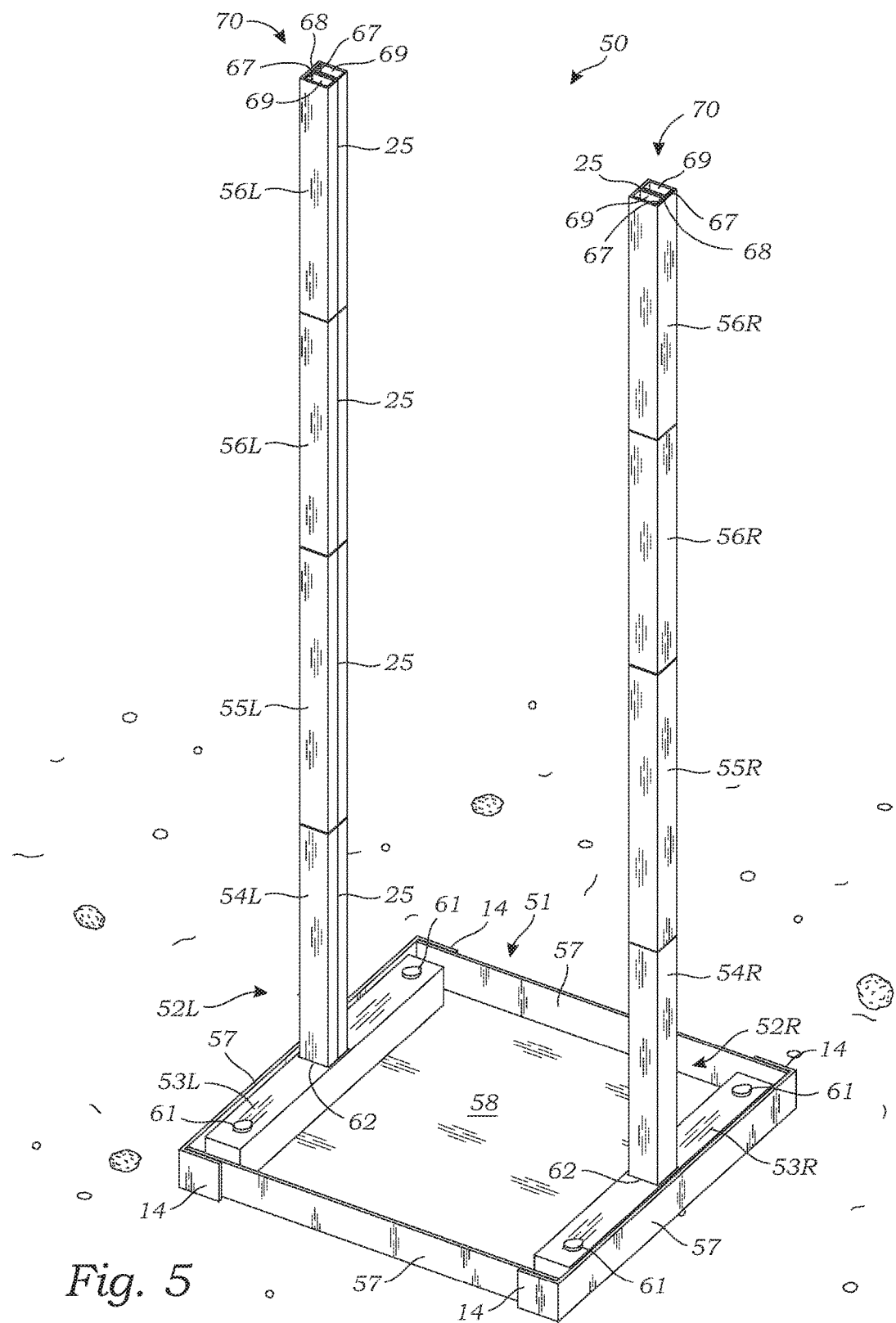
FIG. 5 is a perspective view of the target stand kit of FIG. 4, assembled in accordance with the arrangement shown in FIG. 4.
Figure 9:
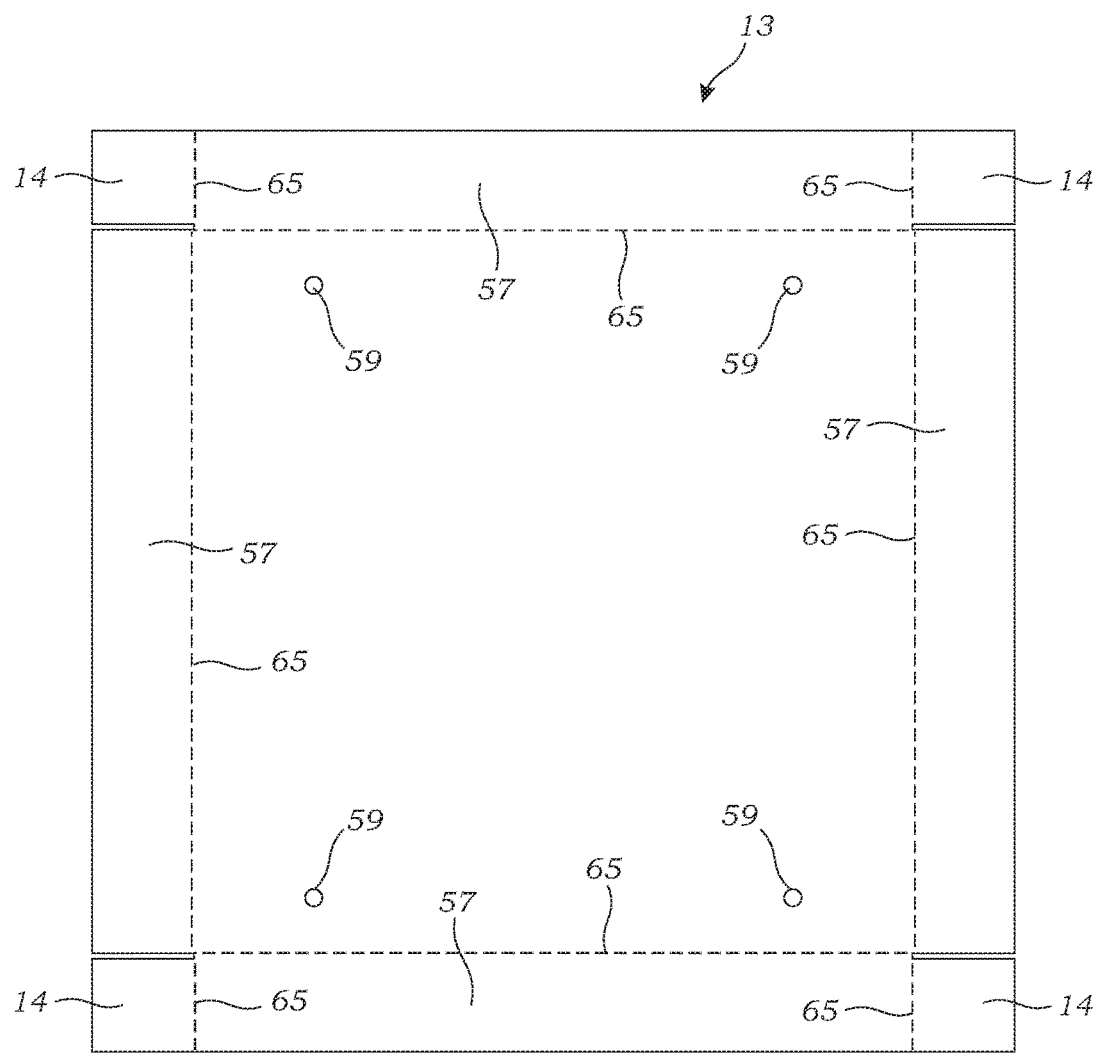
FIG. 9 is a plan view of a pattern layout of a box top component of the target stand kit of FIG. 3.
Figure 10:
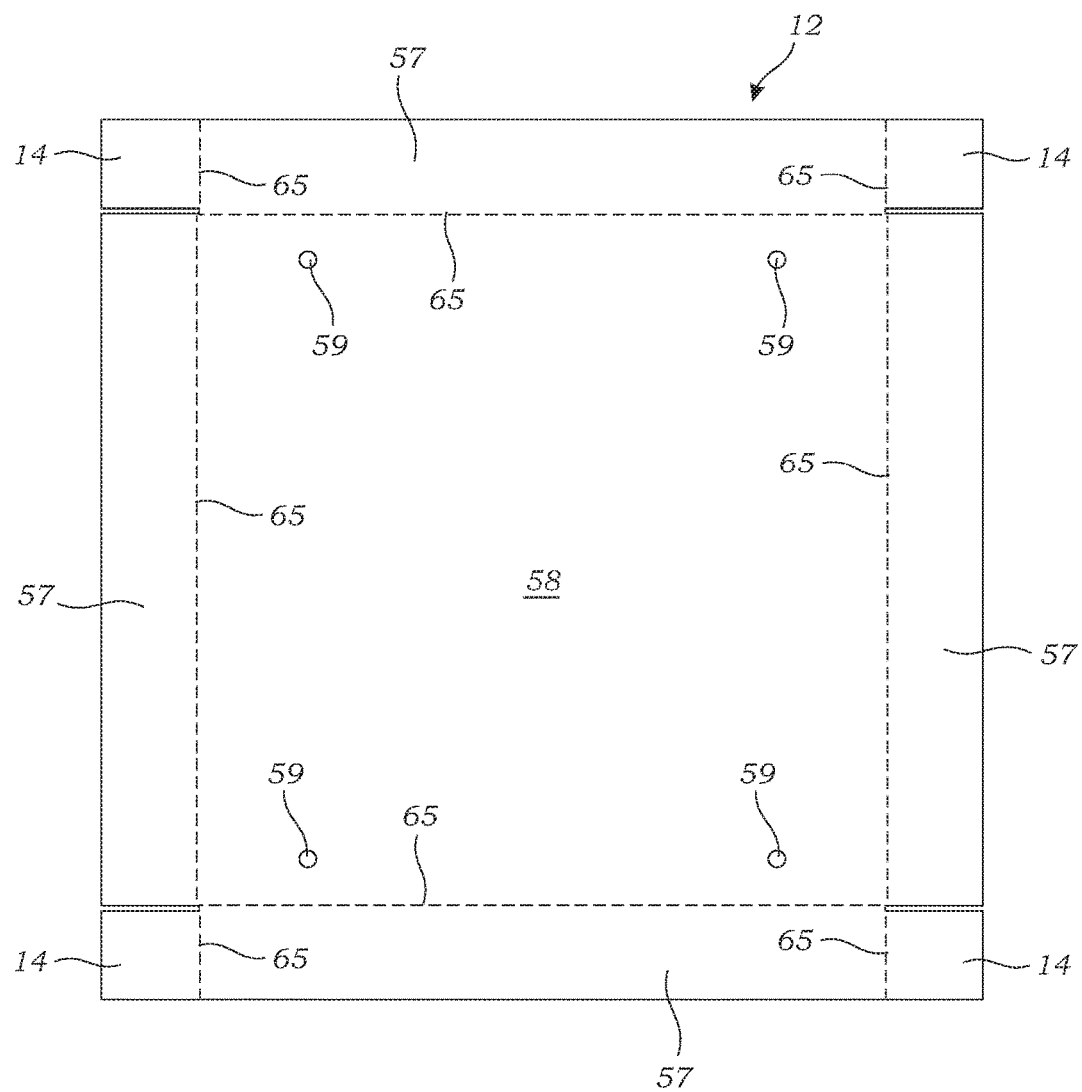
FIG. 10 is a plan view of a pattern layout of a box bottom of the target stand kit of FIG. 3.
Figure 11:
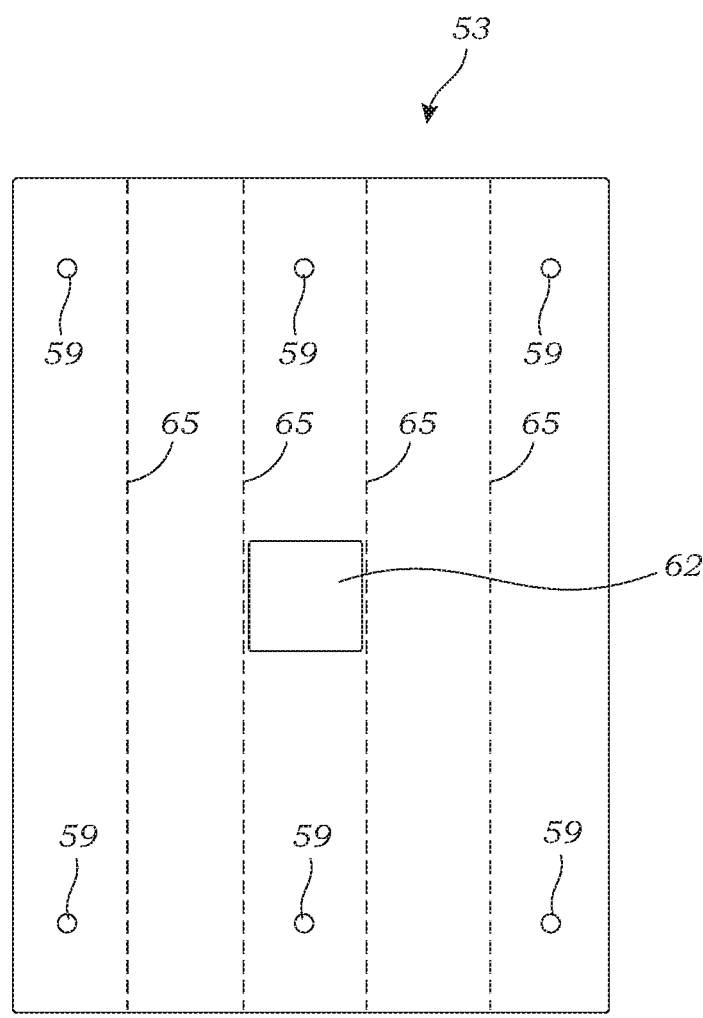
FIG. 11 is a plan view of a pattern layout of a horizontal component of a T-bar leg of the target stand kit of FIG. 3.
Figure 12:
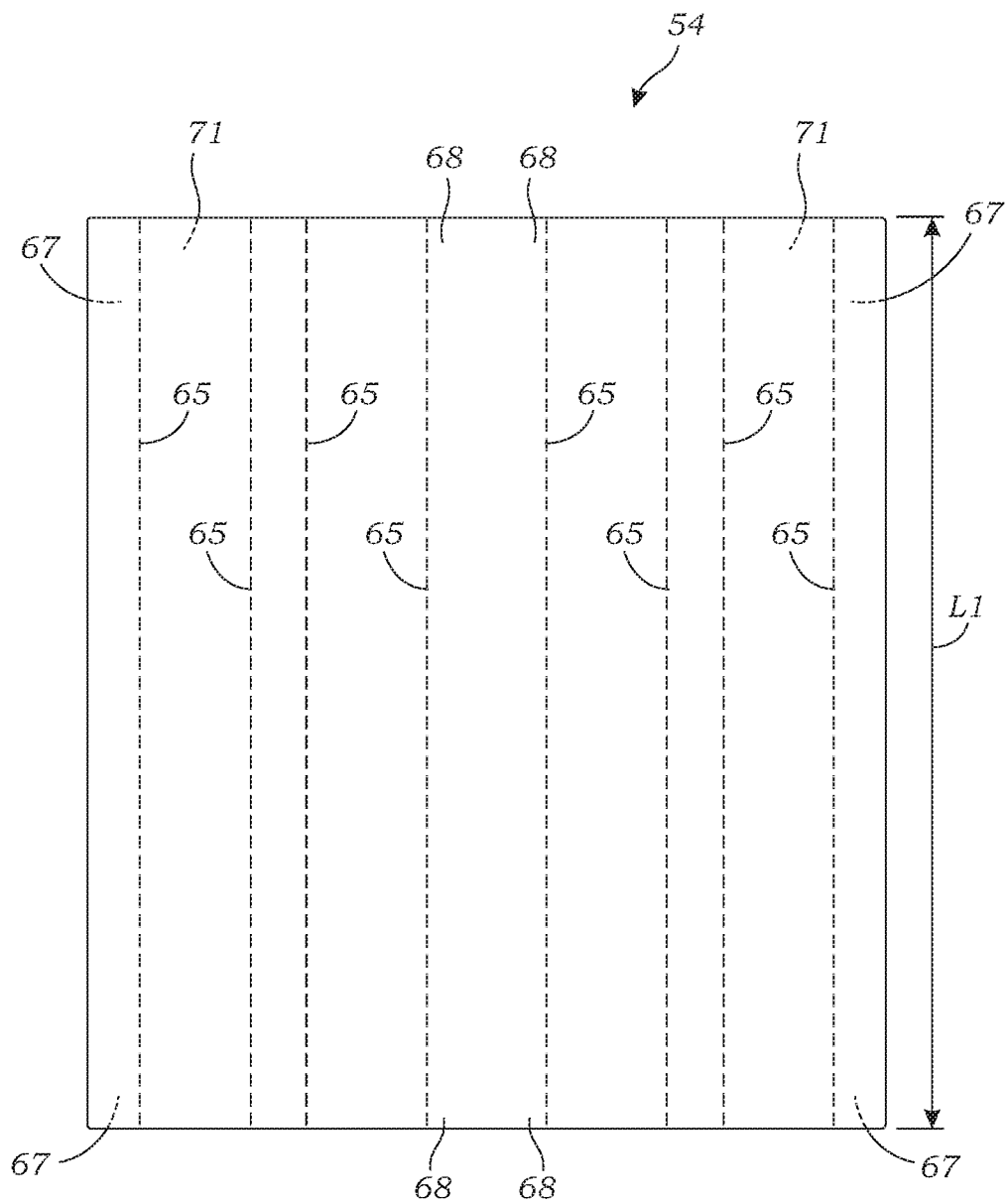
FIG. 12 is a plan view of a pattern layout of a vertical component of a T-bar leg (or of an upright) of the target stand kit of FIG. 3.
Figure 13:
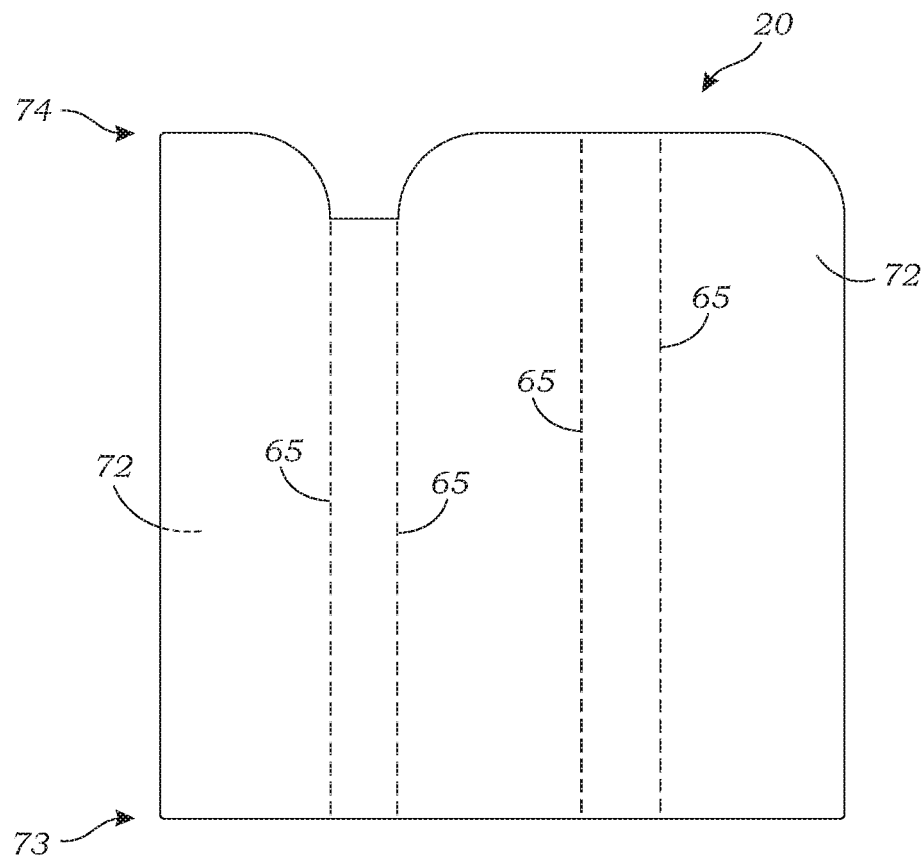
FIG. 13 is a plan view of a pattern layout of a coupler of the target stand kit of FIG.
Figure 14:
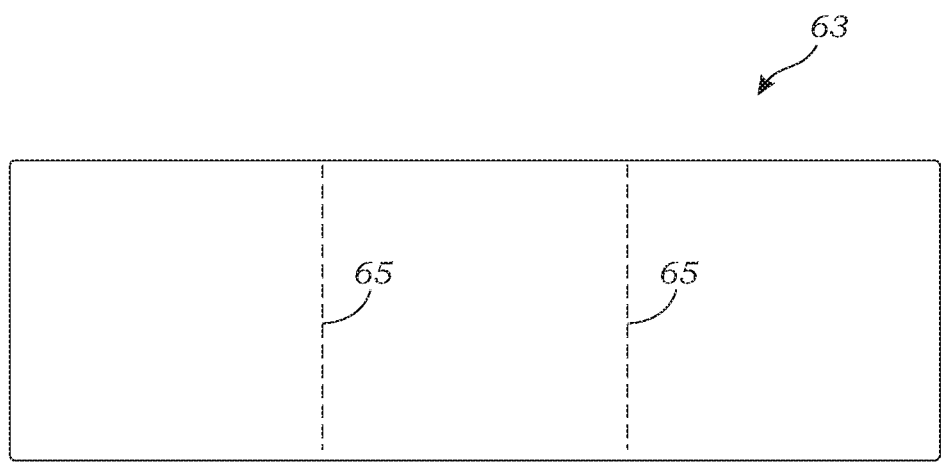
FIG. 14 is a plan view of a pattern layout of a stiffener bracket of the target stand kit of FIG. 3.

FIG. 5 shows a target stand (50) in accordance with an embodiment of the present invention. FIG. 4 shows an exploded view of the same target stand (50). The various components are described in more detail herein, and pattern layouts for the various components are shown in FIGS. 9-14, in which dotted lines represent the folding axes (65) (typically creased and/or perforated) where the material (e.g., corrugated plastic) is folded to form the corresponding components. FIG. 9 shows a pattern layout of a box top (13) which may serve as the base (51) or part thereof. FIG. 10 shows a pattern layout of a box bottom (12) which may serve as the base (51) or part thereof. FIG. 11 shows a pattern layout of a horizontal component (53) of a T-bar leg (52). FIG. 12 shows a pattern layout of a vertical component (54) of a T-bar leg (52), which is also the pattern layout for the uprights (55, 56) (although the length L1 of the long uprights (55) is more than that of the short uprights (56)). FIG. 13 shows a pattern layout of a one-piece coupler (20). FIG. 14 shows a pattern layout of a stiffener bracket (63).

Turning to FIG. 5, a target stand (50) is shown in accordance with an embodiment of the present invention. The target stand (50) is symmetrical, so like components on the right side (referenced with an "R" suffix) and on the left side (referenced with an "L" suffix) are sometimes referred to herein without distinction by omitting such suffixes. The target stand (50) includes a base (51), right and left T-bar legs (52R, 52L) having horizontal components (53R, 53L) and vertical components (54R, 54L), right and left long uprights (55R, 55L), and right and left short uprights (56R, 56L). The vertical components (54) of the T-bar legs (52) are the same or similar in design to the uprights (55, 56), but are preferably pre-attached to the horizontal components (53) of the T-bar legs (52) as described herein, so as not to require any further assembly by an end user. As such, the vertical components (54) are often referred to herein separately from the uprights (55, 56).

Figure 1A:
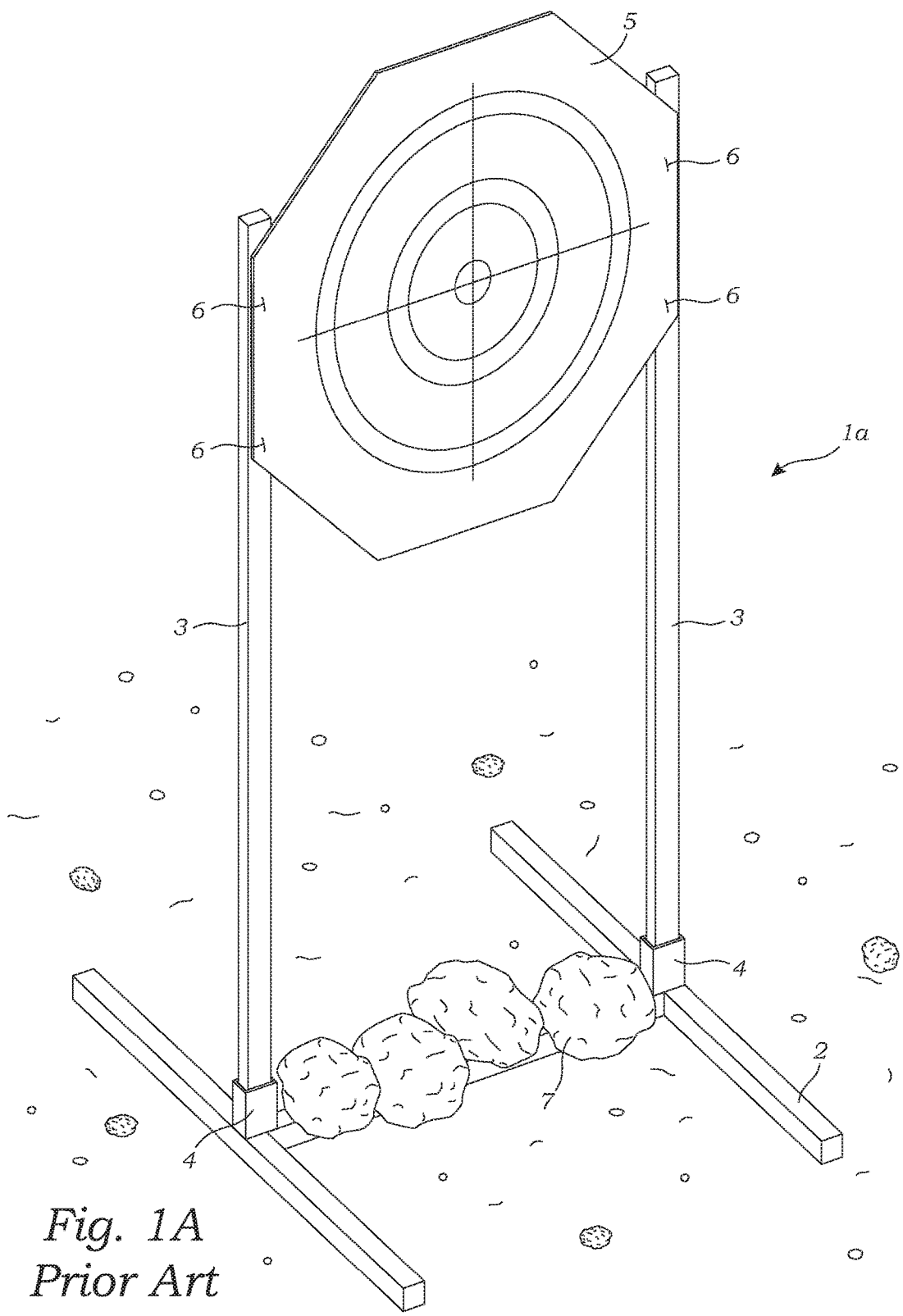
FIG. 1A is a perspective view of a first type of PRIOR ART target stand.
Figure 1B:
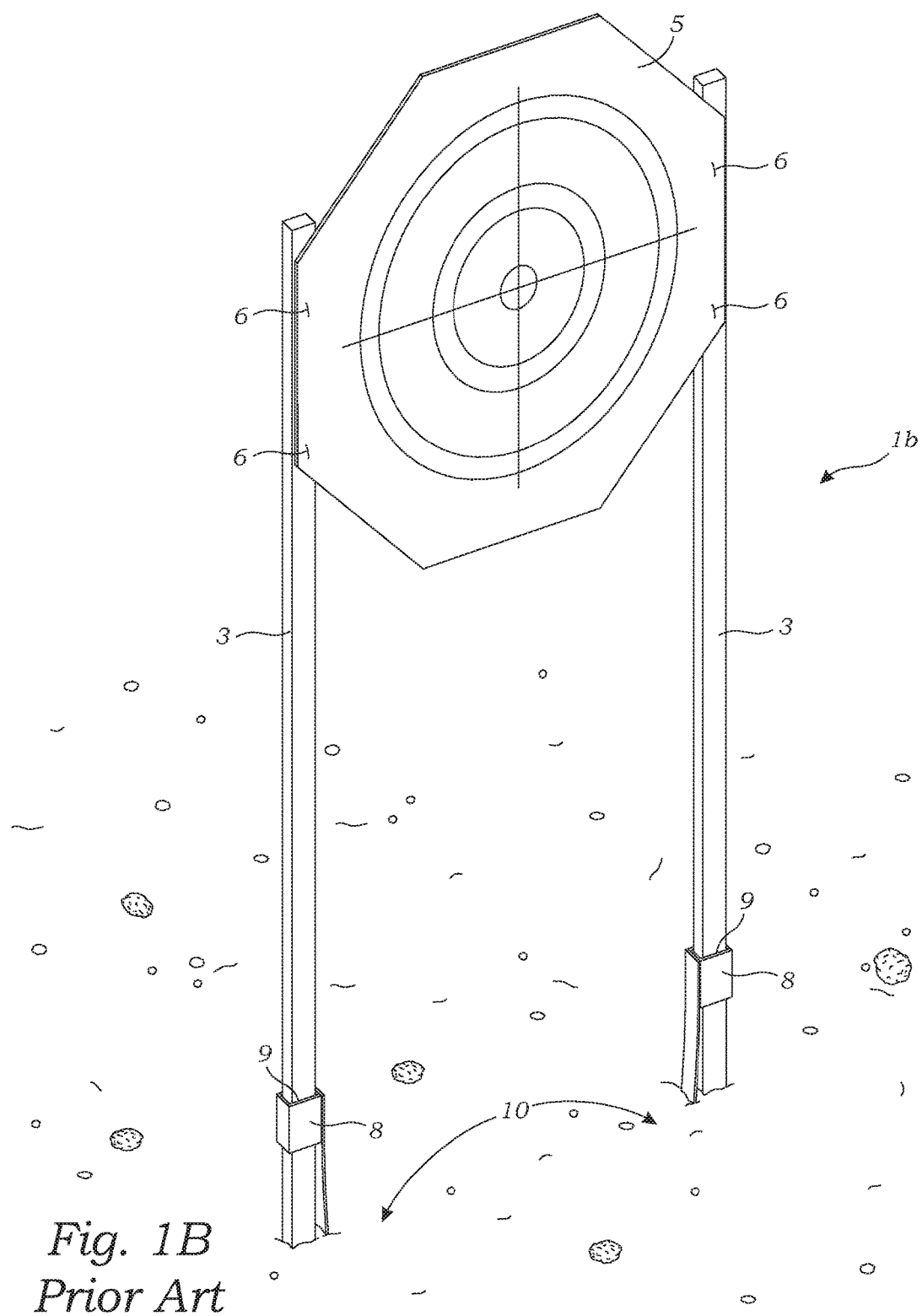
FIG. 1B is a perspective view of a second type of PRIOR ART target stand.
Figure 2:
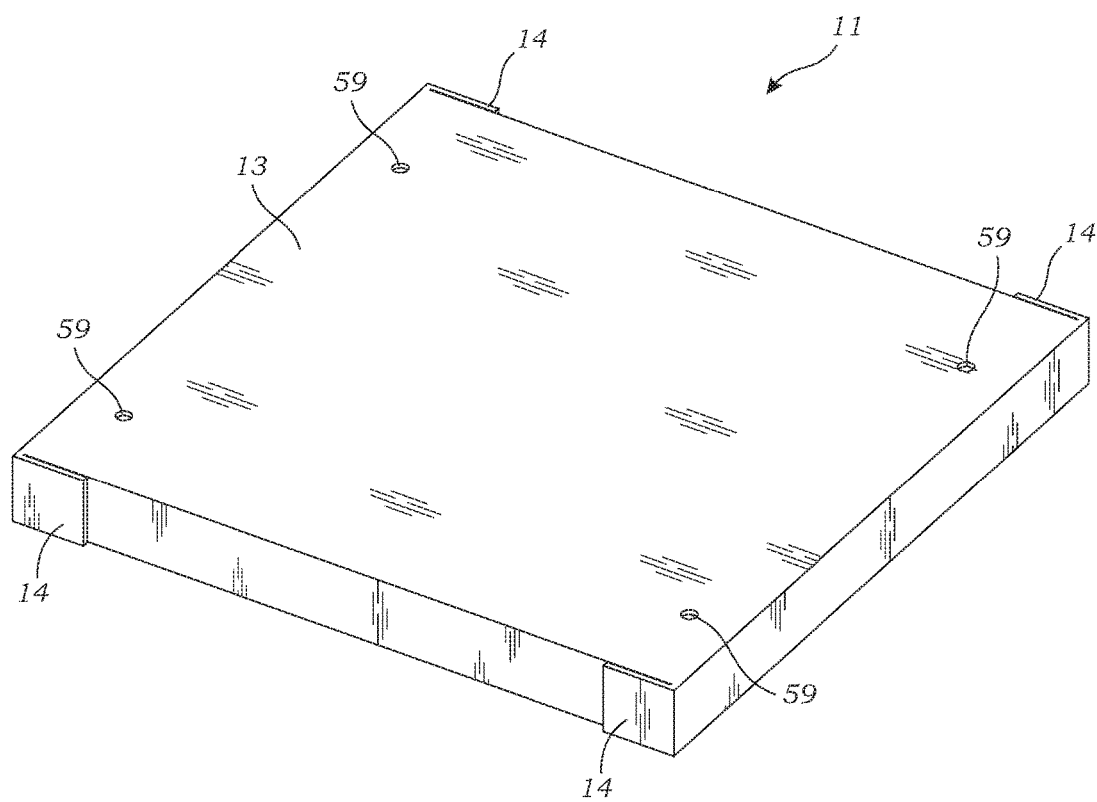
FIG. 2 is a perspective view of a target stand kit packaged in accordance with an embodiment of the present invention.
Figure 3:
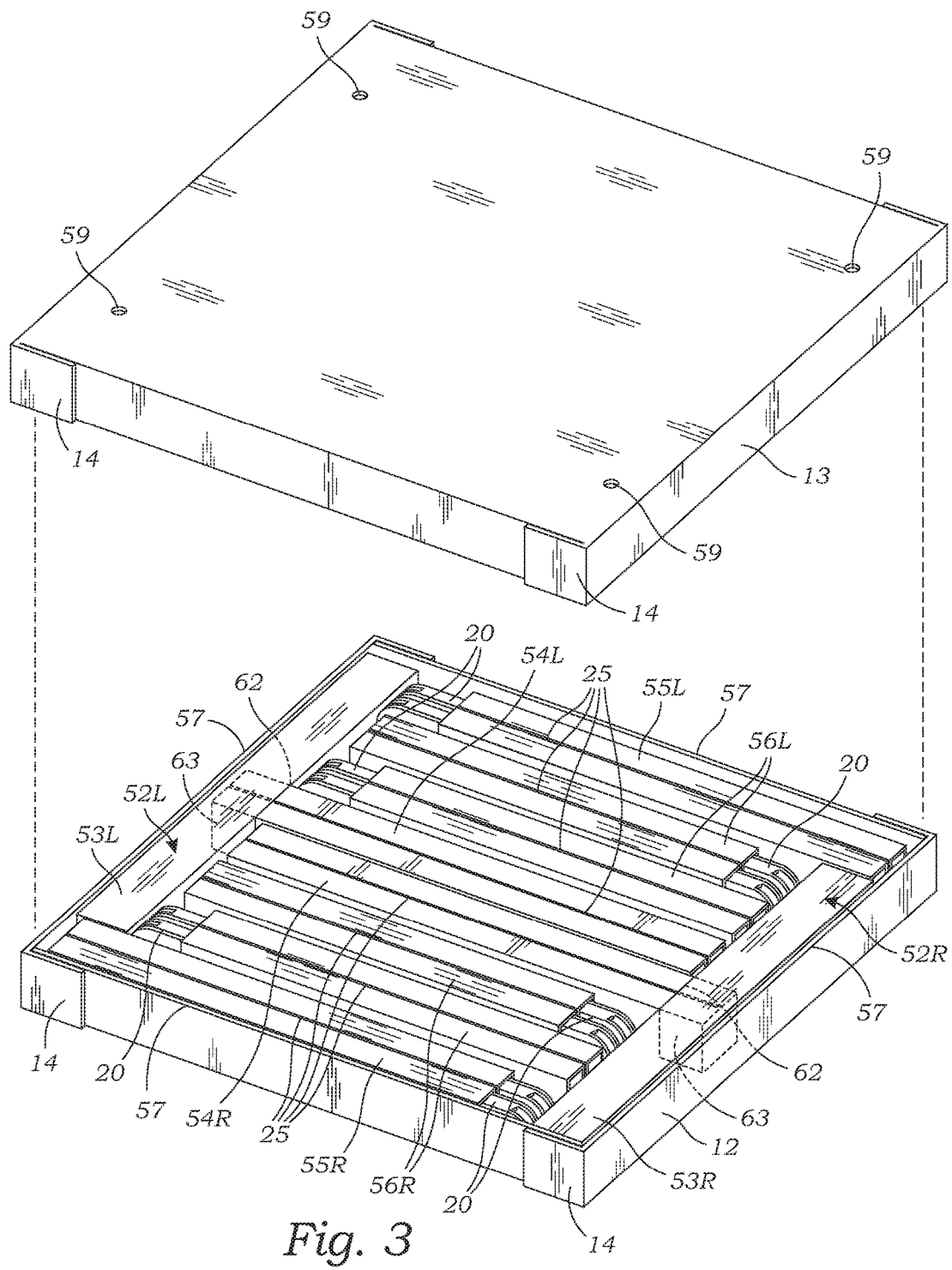
FIG. 3 is a perspective view of the packaged target stand kit of FIG. 2, with the top removed to show an arrangement of components within.

The base (51) is preferably the bottom (12) of the box (11) used to store and transport the target stand (50) (see, e.g., FIGS. 2 and 3). The base (51) may also be the box top (13), or the box top (13) and box bottom (12) combined one inside the other. The base (51) has a floor (58) and raised edges (57). Rocks (7), dirt, sandbags, weights, or other items may be placed on the floor (58) to provide additional stability. The base (51) also has anchor holes (59) corresponding to and aligned with anchor holes (59) in the corresponding horizontal components (53) of the T-bar legs (52), to allow pegs (61), nails, stakes, or the like to further secure the target stand (50) to the ground (10). These holes (59) are in the box bottom (12) and/or the box top (13) depending on which one or both will be used as the base (51). The base (51) also has fastening tape (60) (see, e.g., FIGS. 4 and 7) corresponding to and aligned with opposing fastening tape (60) on the horizontal components (53) of the T-bar legs (52).

The fastening tape (60) may be hook and loop fasteners such as VELCRO, or mushroom head fasteners such as 3M's DUAL LOCK model number SJ3782, SJ3550, or other similar material. The drawings show sixteen strips of fastening tape (60), namely: two on the floor (58) of the box bottom (12) on the right side; two on the adjacent raised edge (57) of the box bottom (12) on the right side; two on the bottom of the horizontal component (53R) corresponding to the two on the right side of the floor (58); two on the outer right surface of the horizontal component (53R) corresponding to the two on the adjacent raised edge (57) on the right side of the box bottom (12); two on the floor (58) of the box bottom (12) on the left side; two on the adjacent raised edge (57) of the box bottom (12) on the left side; two on the bottom of the horizontal component (53L) corresponding to the two on the left side of the floor (58); and two on the outer left surface of the horizontal component (53L) corresponding to the two on the adjacent raised edge (57) of the box bottom (12) on the left side. Various amounts of fastening tape (60) may be used, and the length of the strips may vary, although two-inch strips are sufficient.

Pattern layouts for the base (51) are shown in FIG. 9 (box top (13)) and FIG. 10 (box bottom (12)). These pattern layouts are essentially the same, except the box top (13) has dimensions slightly larger than the box bottom (12). Once the material is folded along the folding axes (65), the corner flaps (14) of the box top (13) and box bottom (12) are then glued or welded to the inside of the respective raised edges (57), or to the outside of the respective raised edges (57) as seen in FIGS. 2-7.

Turning to the T-bar legs (52), each T-bar leg (52) is preferably preassembled with the vertical component (54) inserted into a cutout (62) of the horizontal component (53) and attached to the horizontal component (53). A form of attachment is shown in FIG. 4. Specifically, opposing stiffener brackets (63) are attached to the inside walls of the horizontal components (53) adjacent the cutouts (62), and each includes a surface (64) facing the cutout (62). In this manner, the surfaces (64) combine with the inner side walls of the horizontal components (53) to form contact surfaces for all four sides of the vertical component (54). The stiffener brackets (63) are attached to the inside walls of the horizontal components (53) by glue or welding. The vertical components (54) are attached to the inner side walls of the horizontal components (53) and to the cutout-facing surfaces (64) of the stiffener brackets (63) in a similar manner. The stiffener brackets (63) shown in FIG. 4 (see also FIG. 14) are three-sided and attached to the inner side walls of the horizontal components (53). However, they may be four-sided, five-sided, or six-sided (like a box), and may be attached to the upper and lower inner surfaces of the horizontal components (53) instead of or in addition to being attached to the inner side walls thereof. In each of these alternatives, the stiffener brackets (63) should have a cutout-facing surface (64).

Figure 7:
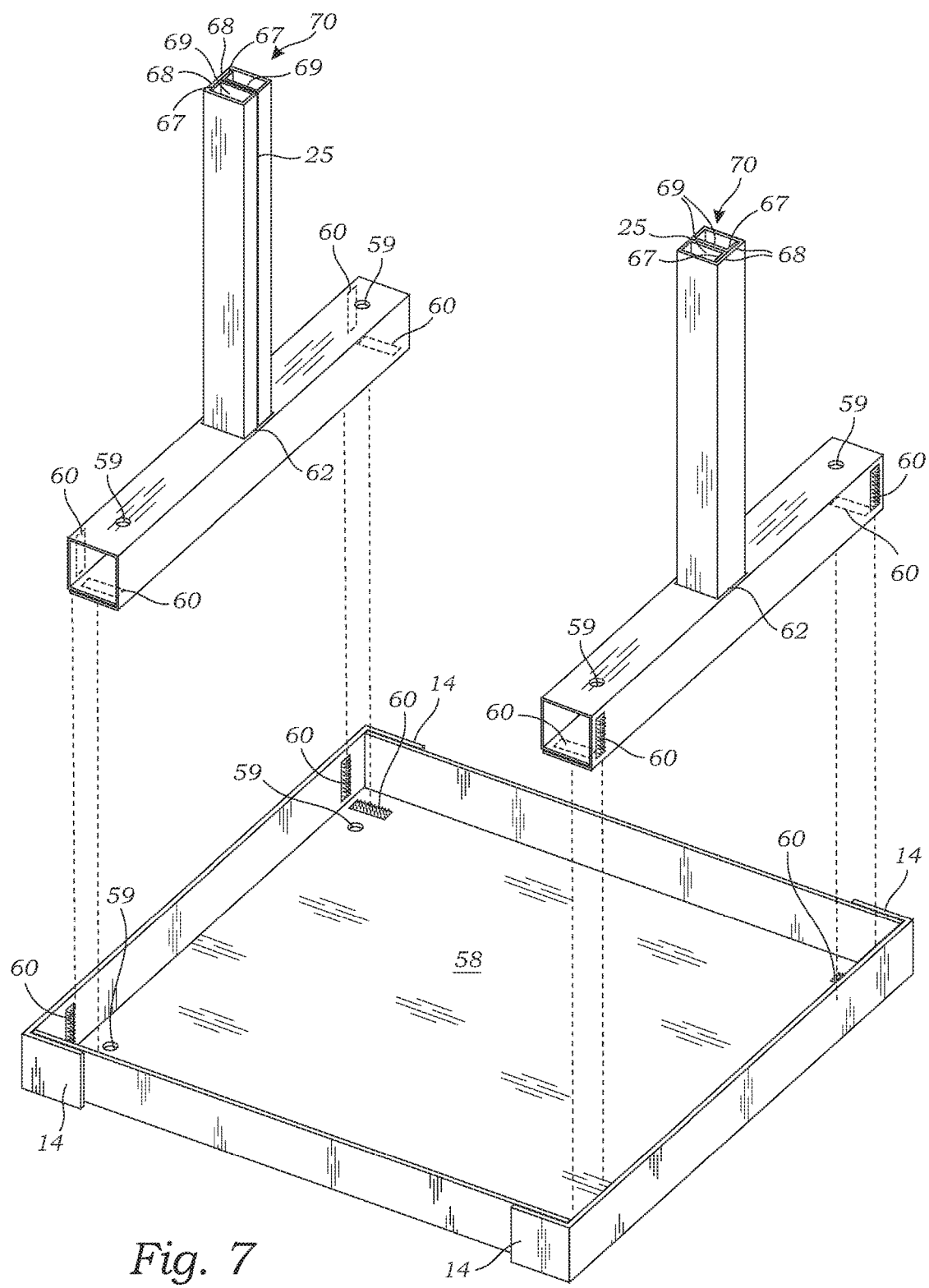
FIG. 7 is a perspective view of T-bar leg components and a base of the target stand kit of FIG. 5, showing fastening tape positioned thereon.

The horizontal components (53) also include anchor holes (59) and fastening tape (60). The anchor holes (59) are positioned to be aligned with anchor holes (59) in the base (51) so that pegs (61), nails, stakes, or the like may be punched or driven therethrough to the ground to help anchor the target stand (50) to the ground, instead of or in addition to rocks (7) or other weighted items that can be placed on the floor (58) of the base (51). The fastening tape (60) is positioned on the bottom and outer surfaces of the horizontal component (53) to be aligned with mating fastening tape (60) on the floor (58) of the base (51) and on the inside portions of the outer raised edges (57) of the base (51). This is best seen in FIGS. 4 and 7. The fastening tape (60) removably secures the T-bar legs (52) to the base (51).

A pattern layout for a horizontal component (53) is shown in FIG. 11. Once the material is folded along folding axes (65), the anchor holes (59) line up, and the two contacting surfaces forming the bottom layer of the horizontal component (53) are glued or welded together, as seen in FIG. 4 and FIG. 7. A pattern layout for a stiffener bracket (63) is shown in FIG. 14. Once the material is folded along folding axes (65), the stiffener bracket (63) is glued or welded to the horizontal component (53) at locations as shown in FIG. 4 and as described herein. This may occur after the horizontal component (53) is glued, or partially before (e.g., one surface) and partially after (remaining surface(s)).

Turning to the vertical components (54), they are secured to the horizontal components (53) by glue or welding. The contact points are best seen in FIG. 4, showing two sides of the vertical components (54) contacting the inner walls of the horizontal component (53), and two other sides contacting the cutout-facing surfaces (64) of the stiffener brackets (63).

Figure 6:
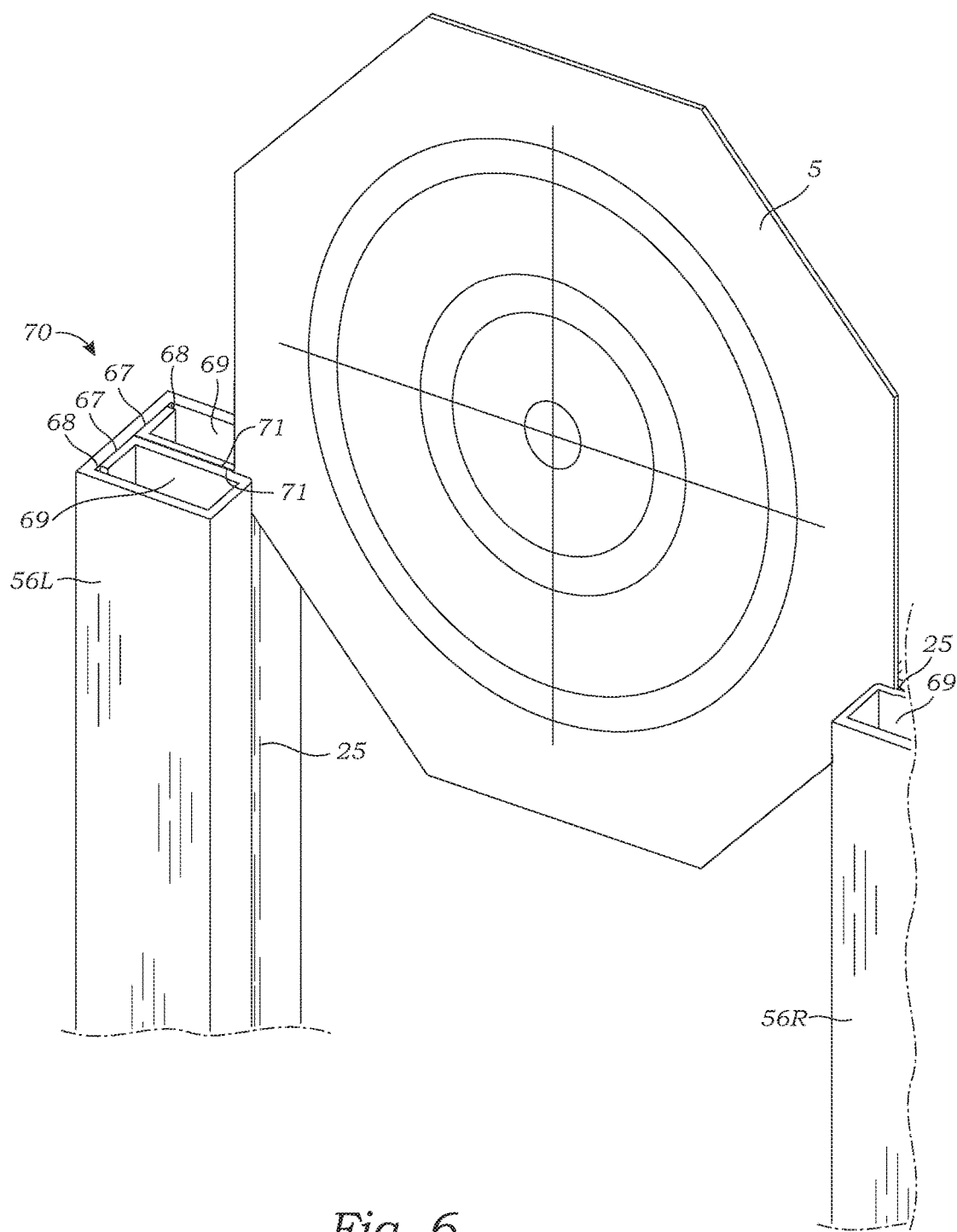
FIG. 6 is a close-up perspective view of the upper portion of the target stand kit of FIG. 5, showing a target being inserted thereon.

A pattern layout of a vertical component (54) is shown in FIG. 12. Once the material from the pattern is folded along fold axes (65), contact surfaces (67) are glued or welded to the attachment points (68). Doing so creates a dual-channel open top (70) with two channels (69) for receiving couplers (20), and holds the surfaces (71) between the channels (69) tightly together to form a groove (25) along the length of the vertical component (54). The groove (25) typically will be paper-thin, but may be up to 1/32 of an inch wide or 1/16 of an inch wide or even wider. The surfaces (71) between the channels (69) may be separated or flexed with slight pressure, allowing flat edges of a target (5) to be inserted therein and then secured therein upon release of the pressure. The target (5) may be inserted into the groove (25) vertically (from the top of the groove (25) as shown in FIG. 6) or laterally (sideways into the groove (25)). Once inserted, the target (5) may be slid up and down the groove (25) as needed to adjust target height, and the natural spring force of the vertical component (54) causes the surfaces (71) between the channels (69) to grasp and hold the target (5) in place. No tools, tape, glue, staples, or other equipment is needed to secure the target (5) in this manner.

Turning now to the uprights (55, 56), there are long uprights (55) and short uprights (56), both structurally the same as the vertical component (54) of the T-bar leg (52). As such, the pattern layout for them is shown in FIG. 12, and the discussion herein regarding folding, gluing, dual-channel open tops (70), and grooves (25) as related to the vertical components (54) of the T-bar legs (52) applies equally to the uprights (55, 56). The long uprights (55) differ from the short uprights (56) in that the long uprights (55) are longer than the short uprights (56). This is due to the packaging layout as seen in FIG. 3 (discussed more fully herein), which allows for two long uprights (55) to be placed along the outer edges of the box (11) due to the offset configuration of the T-bar legs (52).

During use, the uprights (55, 56) are all interchangeable, but if one of the long uprights (55) is used on one side of the target stand (50), the other long upright (55) should be used on the other side. If used, the uprights (55, 56) may be in the same relative vertical location on each side, but that is not required. For example, if each side of the target stand (50) has a long upright L (55) and two short uprights S (56), they may be positioned above the vertical component (54) of the T-Bar legs (52) in a sequence such as L-S-S, S-L-S, or S-S-L, and the right side sequence does not have to match the left side sequence, because the overall height of each side will be the same for any of the combinations.

Figures 8A, 8B:
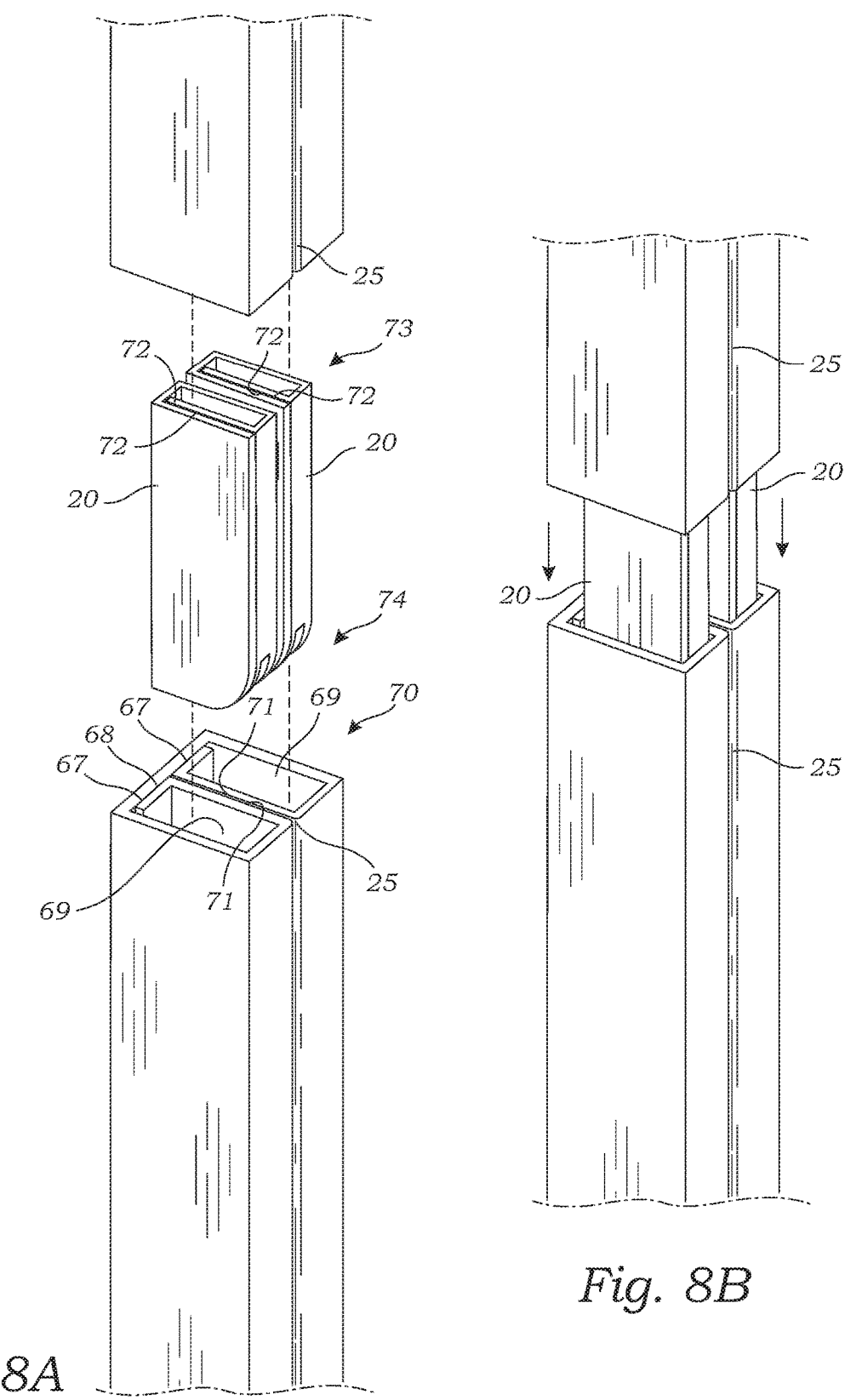
FIG. 8A is an exploded perspective view of two upright components and a two-piece coupler (or pair of one-piece couplers) of the target stand kit of FIG. 5.
FIG. 8B is a perspective view of the upright components and coupler(s) of FIG. 8A, showing the uprights being connected by the coupler(s).

The uprights (55, 56) are preferably preassembled with couplers (20) attached to the bottom end. The couplers (20) serve to removably connect the uprights (55, 56) to the top of another upright (55, 56), or in the case of an upright (55, 56) immediately above a vertical component (54) of a T-bar leg (52), to the top of the vertical component (54). A pattern layout for a coupler (20) is shown in FIG. 13. Once folded along the fold axes (65), the contact surfaces (72) are glued or welded to form the coupler (20), as best seen in FIG. 8A. The top ends (73) of the couplers (20) have a straight profile, and the bottom ends (74) of the couplers (20) have a curved profile. Preferably, each upright (55, 56) has two couplers (20), one in each of the two dual channels (69). In this instance, since the two couplers (20) together serve as a single connecting joint, they may be referred to as a single coupler (20).

The outer surfaces of top ends (73) of the couplers (20) are glued or welded to the inside surfaces of the dual channels (69) of an upright (55, 56), to a depth about half the length of the couplers (20). The curved bottom ends (74) of the couplers (20) thus protrude from the bottom of the uprights (55, 56). The bottom ends (74) are curved to facilitate insertion thereof into the dual channels (69) of the dual-channel open tops (70) of uprights (55, 56) or vertical components (54). The bottom ends (74) of the couplers (20) are thus referred to sometimes herein as the mating portions. Once a first upright (55, 56) is inserted as such into the dual-channel open top (70) of another upright (55, 56), the groove (25) of the first upright (55, 56) coincides with the groove (25) of the other upright (25), such that together they form a substantially continuous groove (25). This is best seen in FIG. 5, which shows one long upright (55) and two short uprights (56) on each of the left and right sides of the target stand (50), and the substantially continuous groove (25) is visible on the left side. The grooves (25) of each of the uprights (55, 56) and the vertical components (54) are inwardly-facing, i.e., the grooves (25) of the left side components face towards the right, and the grooves (25) of the right side components face toward the left, so that flat edges of a target (5) may be inserted therein as seen in FIG. 6.

Turning now to FIG. 3, a perspective view of a target stand kit is shown in accordance with an aspect of the present invention. The target stand kit includes a box bottom (12), a box top (13), two T-bar legs (52), two long uprights (55), and four short uprights (56). The T-bar legs (52) each have a vertical component (54), a horizontal component (53), and a stiffener bracket (63), all positioned and glued or welded together as described herein. The uprights (55, 56) each have two couplers (20) (each pair of couplers (20) serving as a single two-piece connecting joint, which may thus also be referred to as a single coupler), positioned and glued or welded together as described herein. Fastening tape (60) is pre-attached to the box bottom (12) and horizontal components (53) of the T-bar legs (52) as described herein. Flat targets (5) may also fit in the box (11) above or below the other components. Likewise, pegs (61) and/or extra strips and/or a roll of fastening tape (60) may fit into the box (11) either loosely or in small packages.

To accommodate the two pre-assembled T-bar legs (52) and maintain a flat profile of the box (11) as shown in FIG. 2, the length of the horizontal components (53) of the T-bar legs (52) is slightly less than the length of the box (11), preferably by an amount equal to the width of an upright (55, 56). This allows the T-bar legs (52) to be positioned offset from each other, and long uprights (55) to be positioned at opposite sides of the box (11), as shown in FIG. 3. The short uprights (56) are positioned to fill up the remaining space in the box (11) as shown, such that the box top (13) may be placed over the box bottom (12) to cover the contents (T-bar legs (52) and uprights (55, 56)), resulting in a flat profile target stand kit as seen in FIG. 2. Markings (not shown) may be printed on the floor (58) of the box bottom (12) to assist in the layout of components for repackaging. The kit as such is self-contained, lightweight, durable, portable, and has a minimal profile. The kit is also easy to transport and store, and is easy to assemble into a target stand (50) as described herein, and to disassemble and repackage for later reuse.

To assemble the target stand (50) from a kit packaged such as shown in FIG. 3, the T-bar legs (52) are fastened to the box bottom (12) by aligning the fastening tape (60) on the T-bar legs (52) with the fastening tape (60) on the box bottom (12), an upright (55 or 56) is inserted into each of the left and right vertical components (54) of the T-bar legs (52) using the couplers (20) as connecting joints, and additional uprights (55, 56) are inserted in an interlocking, segmented fashion on each of the right and left sides of the target stand (50) as desired (see, e.g., FIGS. 4, 5, 8A, and 8B). If it is desired to have the box top (13) serve as part of the base (51), the box top (13) is placed under the box bottom (12). A target (5) is inserted into the inwardly-facing right and left grooves (25) formed by the vertical components (54) and the uprights (55, 56), and the target stand (50) is then ready for use. Rocks (7) or other weights may be placed on the floor (58) of the base (51), and/or pegs (61) or the like may be inserted through anchor holes (59). The aforementioned steps may occur in any order.

Additional features (not shown) may be included with the target stand (50). For example, top caps (not shown) may be placed onto the dual channel open tops (70) of the uppermost uprights (55, 56) to prevent rainwater and/or debris from entering the uprights (55, 56). Weep holes (not shown) may be present in various components to allow water to drain. Sleeves (not shown) may be placed around the uprights (55, 56) at joints where one upright (55, 56) is coupled to another upright (55, 56), to provide further stability. The sleeves may be corrugated plastic sized for a snug fit, and may be configured to slide over the top most upright (55, 56) and be positioned at a desired joint, or configured to be clamped directly over a joint. The sleeves may also be rubber or other suitable material.

Braces (not shown) may be placed at the front and/or back joints of the T-bar legs (52) where the vertical components (54) meet the horizontal components (53). Such braces may have an L-shaped profile with one leg abutting against the vertical component (54) and the other leg abutting against the horizontal component (53) of a corresponding T-bar leg (52). The L-shaped brace may have a connecting hypotenuse. The braces may also be simply linear connecting from a vertical component (54) to a corresponding horizontal component (53). Such braces may be useful in embodiments using cardboard, and/or embodiments without stiffener brackets (63).

Typical dimensions of some of the components are as follows: the horizontal components (53) are approximately 18.5 inches long; the vertical components (54) are approximately 18 inches long, and extend approximately 15 inches above the horizontal components (53); the long uprights (55) are approximately 14.75 inches long; the short uprights (56) are approximately 12 inches long; and the couplers (20) are approximately 7 inches long, with approximately 3.5 inches extending past the bottom ends of the uprights (55, 56).

Although particular embodiments and aspects of the present invention have been shown and described, it is not intended to limit the present invention to the preferred embodiments; and those skilled in the art will understand that various changes and modifications may be made without departing from the spirit and scope of the present invention. Thus, the present invention is intended to cover alternatives, modifications, and equivalents, which may be included within the spirit and scope of the present invention as defined by the claims.

What is claimed is:

1. A target stand comprising:
   a) a base having a floor and raised edges;
   b) a right side T-bar leg comprising:
      i) a right side horizontal component having an upper surface with a right side cutout therein; and
      ii) a right side vertical component positioned in the right side cutout and secured to the right side horizontal component, the right side vertical component having an inwardly-facing groove and a dual-channel open top;
   c) a left side T-bar leg comprising:
      i) a left side horizontal component having an upper surface with a left side cutout therein; and
      ii) a left side vertical component positioned in the left side cutout and secured to the left side horizontal component, the left side vertical component having an inwardly-facing groove and a dual-channel open top;
   d) a first right side upright having an inwardly-facing groove, a dual-channel open top, and a bottom having a coupler mating with the dual-channel open top of the right side vertical component such that the inwardly-facing groove of the first right side upright coincides with the inwardly-facing groove of the right side vertical component to form a substantially continuous right side inwardly-facing groove configured to removably receive a right edge of a target; and
   e) a first left side upright having an inwardly-facing groove, a dual-channel open top, and a bottom having a coupler mating with the dual-channel open top of the left side vertical component such that the inwardly-facing groove of the first left side upright coincides with the inwardly-facing groove of the left side vertical component to form a substantially continuous left side inwardly-facing groove configured to removably receive a left edge of the target;
   wherein the right side horizontal component is removably secured to a right side of the base;
   wherein the left side horizontal component is removably secured to a left side of the base.

2. The target stand of claim 1, in combination with a target, the target having a left edge removably secured in the substantially continuous left side inwardly-facing groove of the target stand and a right edge removably secured in the substantially continuous right side inwardly-facing groove of the target stand.

3. The target stand of claim 1, further comprising a right side stiffener bracket secured to inner walls of the right side horizontal component adjacent the right side cutout, and a left side stiffener bracket secured to inner walls of the left side horizontal component adjacent the left side cutout, and wherein the right side vertical component is secured to the right side horizontal component by the right side stiffener bracket, and the left side vertical component is secured to the left side horizontal component by the left side stiffener bracket.

4. The target stand of claim 1, wherein the right side horizontal component is removably secured to the right side of the base at the floor and at one of the raised edges with fastening tape, and the left side horizontal component is removably secured to the left side of the base at the floor and at a second one of the raised edges with fastening tape.

5. The target stand of claim 1, wherein the base has anchor holes therein, the right side horizontal component of the right side T-bar leg has an anchor hole therein aligned with a first one of the anchor holes in the base, and the left side horizontal component of the left side T-bar leg has an anchor hole therein aligned with a second one of the anchor holes in the base.

6. The target stand of claim 1 wherein the mating portion of the coupler of the first right side upright is curved, and the mating portion of the coupler of the first left side upright is curved.

7. The target stand of claim 1, further comprising:
   a second right side upright having an inwardly-facing groove, a dual-channel open top, and a bottom having a coupler mating with the dual-channel open top of the first right side upright such that the inwardly-facing groove of the second right side upright coincides with the inwardly-facing groove of the right side vertical component and the inwardly-facing groove of the first right side upright to extend the substantially continuous right side inwardly-facing groove; and
   a second left side upright having an inwardly-facing groove, a dual-channel open top, and a bottom having a coupler mating with the dual-channel open top of the first left side upright such that the inwardly-facing groove of the second left side upright coincides with the inwardly-facing groove of the left side vertical component and the inwardly-facing groove of the first left side upright to extend the substantially continuous left side inwardly-facing groove.

8. The target stand of claim 7 wherein the mating portion of the coupler of the first right side upright is curved, the mating portion of the coupler of the first left side upright is curved, the mating portion of the coupler of the second right side upright is curved, and the mating portion of the coupler of the second left side upright is curved.

9. The target stand of claim 7, further comprising:
   a third right side upright having an inwardly-facing groove, a dual-channel open top, and a bottom having a coupler mating with the dual-channel open top of the second right side upright such that the inwardly-facing groove of the third right side upright coincides with the inwardly-facing groove of the right side vertical component and the inwardly-facing groove of the first right side upright and the inwardly-facing groove of the second right side upright to extend the substantially continuous right side inwardly-facing groove; and
   a third left side upright having an inwardly-facing groove, a dual-channel open top, and a bottom having a coupler mating with the dual-channel open top of the second left side upright such that the inwardly-facing groove of the third left side upright coincides with the inwardly-facing groove of the left side vertical component and the inwardly-facing groove of the first left side upright and the inwardly-facing groove of the second left side upright to extend the substantially continuous left side inwardly-facing groove.

10. The target stand of claim 9 wherein the mating portion of the coupler of the first right side upright is curved, the mating portion of the coupler of the first left side upright is curved, the mating portion of the coupler of the second right side upright is curved, the mating portion of the coupler of the second left side upright is curved, the mating portion of the coupler of the third right side upright is curved, and the mating portion of the coupler of the third left side upright is curved.

11. The target stand of claim 1, further comprising a right side brace secured between the right side vertical component and the right side horizontal component, and a left side brace secured between the left side vertical component and the left side horizontal component.

12. The target stand of claim 1, wherein:
the right side T-bar leg, the left side T-bar leg, the first right side upright, and the first left side upright, are made of corrugated plastic;
the right side vertical component is secured to the right side horizontal component by glue or welding;
the left side vertical component is secured to the left side horizontal component by glue or welding;
the coupler of the first right side upright is secured to the first right side upright by glue or welding; and
the coupler of the first left side upright is secured to the first side upright by glue or welding.

13. A target stand comprising:
a) a base having a floor and raised edges;
b) a right side T-bar leg comprising:
   i) a right side horizontal component having an upper surface with a right side cutout therein, the right side horizontal component being removably secured to a right side of the base at the floor and at one of the raised edges with fastening tape; and
   ii) a right side vertical component positioned in the right side cutout and secured to the right side horizontal component with a right side stiffener bracket secured to inner walls of the right side horizontal component, the right side vertical component having an inwardly-facing groove and a dual-channel open top;
c) a left side T-bar leg comprising:
   i) a left side horizontal component having an upper surface with a left side cutout therein, the left side horizontal component being removably secured to a left side of the base at the floor and at one of the raised edges with fastening tape; and
   ii) a left side vertical component positioned in the left side cutout and secured to the left side horizontal component with a left side stiffener bracket secured to inner walls of the left side horizontal component, the left side vertical component having an inwardly-facing groove and a dual-channel open top;
d) a first right side upright having an inwardly-facing groove, a dual-channel open top, and a bottom having a curved coupler mating with the dual-channel open top of the right side vertical component such that the inwardly-facing groove of the first right side upright coincides with the inwardly-facing groove of the right side vertical component to form a substantially continuous right side inwardly-facing groove;
e) a first left side upright having an inwardly-facing groove, a dual-channel open top, and a bottom having a curved coupler mating with the dual-channel open top of the left side vertical component such that the inwardly-facing groove of the first left side upright coincides with the inwardly-facing groove of the left side vertical component to form a substantially continuous left side inwardly-facing groove;
f) a second right side upright having an inwardly-facing groove, a dual-channel open top, and a bottom having a curved coupler mating with the dual-channel open top of the first right side upright such that the inwardly-facing groove of the second right side upright coincides with the inwardly-facing groove of the right side vertical component and the inwardly-facing groove of the first right side upright to extend the substantially continuous right side inwardly-facing groove;
g) a second left side upright having an inwardly-facing groove, a dual-channel open top, and a bottom having a curved coupler mating with the dual-channel open top of the first left side upright such that the inwardly-facing groove of the second left side upright coincides with the inwardly-facing groove of the left side vertical component and the inwardly-facing groove of the first left side upright to extend the substantially continuous left side inwardly-facing groove;
h) a third right side upright having an inwardly-facing groove, a dual-channel open top, and a bottom having a curved coupler mating with the dual-channel open top of the second right side upright such that the inwardly-facing groove of the third right side upright coincides with the inwardly-facing groove of the right side vertical component and the inwardly-facing groove of the first right side upright and the inwardly-facing groove of the second right side upright to extend the substantially continuous right side inwardly-facing groove; and
i) a third left side upright having an inwardly-facing groove, a dual-channel open top, and a bottom having a curved coupler mating with the dual-channel open top of the second left side upright such that the inwardly-facing groove of the third left side upright coincides with the inwardly-facing groove of the left side vertical component and the inwardly-facing groove of the first left side upright and the inwardly-facing groove of the second left side upright to extend the substantially continuous left side inwardly-facing groove.

14. The target stand of claim 13, wherein:
the right side T-bar leg, the left side T-bar leg, the first right side upright, the second right side upright, the third right side upright, the first left side upright, the second left side upright, and the third left side upright are made of corrugated plastic;
the right side vertical component is secured to the right side horizontal component by glue or welding;
the left side vertical component is secured to the left side horizontal component by glue or welding;
the coupler of the first right side upright is secured to the first right side upright by glue or welding;
the coupler of the first left side upright is secured to the first left side upright by glue or welding;
the coupler of the second right side upright is secured to the second right side upright by glue or welding;
the coupler of the second left side upright is secured to the second left side upright by glue or welding;
the coupler of the third right side upright is secured to the third right side upright by glue or welding; and
the coupler of the third left side upright is secured to the third left side upright by glue or welding.

15. A target stand kit comprising:
a) a base having a floor and a perimeter, the perimeter of the floor having a raised left edge, a raised right edge, a raised front edge, and a raised back edge;

b) a cover having a ceiling and a perimeter, the perimeter of the ceiling having a descending left edge, a descending right edge, a descending front edge, and a descending back edge;
c) a right side T-bar leg comprising:
  i) a right side horizontal component having an upper surface with a right side cutout therein; and
  ii) a right side vertical component positioned in the right side cutout and secured to the right side horizontal component, the right side vertical component having an inwardly-facing groove and a dual-channel open top;
d) a left side T-bar leg comprising:
  i) a left side horizontal component having an upper surface with a left side cutout therein; and
  ii) a left side vertical component positioned in the left side cutout and secured to the left side horizontal component, the left side vertical component having an inwardly-facing groove and a dual-channel open top;
e) a first right side upright having an inwardly-facing groove, a dual-channel open top, and a bottom having a coupler configured to mate with the dual-channel open top of the right side vertical component to coincide the inwardly-facing groove of the first right side upright with the inwardly-facing groove of the right side vertical component and thereby form a substantially continuous right side inwardly-facing groove; and
f) a first left side upright having an inwardly-facing groove, a dual-channel open top, and a bottom having a coupler configured to mate with the dual-channel open top of the left side vertical component to coincide the inwardly-facing groove of the first left side upright with the inwardly-facing groove of the left side vertical component and thereby form a substantially continuous left side inwardly-facing groove;
g) a second right side upright having an inwardly-facing groove, dual-channel open top, and a bottom having a coupler configured to mate with the dual-channel open top of the first right side upright such that the inwardly-facing groove of the second right side upright coincides with the inwardly-facing groove of the right side vertical component and the inwardly-facing groove of the first right side upright to extend the substantially continuous right side inwardly-facing groove;
h) a second left side upright having an inwardly-facing groove, a dual-channel open top, and a bottom having a coupler configured to mate with the dual-channel open top of the first left side upright such that the inwardly-facing groove of the second left side upright coincides with the inwardly-facing groove of the left side vertical component and the inwardly-facing groove of the first left side upright to extend the substantially continuous left side inwardly-facing groove;
i) a third right side upright having an inwardly-facing groove, a dual-channel open top, and a bottom having a coupler configured to mate with the dual-channel open top of the second right side upright such that the inwardly-facing groove of the third right side upright coincides with the inwardly-facing groove of the right side vertical component and the inwardly-facing groove of the first right side upright and the inwardly-facing groove of the second right side upright to extend the substantially continuous right side inwardly-facing groove; and
j) a third left side upright having an inwardly-facing groove, a dual-channel open top, and a bottom having a coupler configured to mate with the dual-channel open top of the second left side upright such that the inwardly-facing groove of the third left side upright coincides with the inwardly-facing groove of the left side vertical component and the inwardly-facing groove of the first left side upright and the inwardly-facing groove of the second left side upright to extend the substantially continuous left side inwardly-facing groove;
wherein the descending edges of the cover overlap the raised edges of the base to thereby form a container having a right edge, a left edge, a front edge, and a back edge;
wherein the right side T-bar leg is positioned in the container on the floor with the right side horizontal component abutting the right edge of the container and the front edge of the container, leaving an open length along the right edge of the container and an open length along the front edge of the container, and with the right side vertical component extending across the floor of the base towards the left edge of the container;
wherein the left side T-bar leg is positioned in the container on the floor with the left side horizontal component abutting the left edge of the container and the back edge of the container, leaving an open length along the left edge of the container and an open length along the back edge of the container, and with the left side vertical component extending across the floor of the base towards the right edge of the container;
wherein the right side vertical component abuts with the left side vertical component and the third right side upright, and extends to and abuts with the left side horizontal component;
wherein the left side vertical component abuts with the right side vertical component and the third left side upright, and extends to and abuts with the right side horizontal component;
wherein the first right side upright is positioned in the container on the floor abutting the open length of the front edge of the container, the open length of the left edge of the container, the right side horizontal component, the left side horizontal component, and the second right side upright;
wherein the first left side upright is the same length as the first right side upright, and is positioned in the container on the floor abutting the open length of the back edge of the container, the open length of the right edge of the container, the left side horizontal component, the right side horizontal component, and the second left side upright;
wherein the second right side upright is shorter than the first right side upright, and is positioned in the container on the floor abutting the first right side upright, the right side horizontal component, the left side horizontal component, and the third right side upright;
wherein the second left side upright is the same length as the second right side upright, and is positioned in the container on the floor abutting the first left side upright, the right side horizontal component, the left side horizontal component, and the third left side upright;
wherein the third right side upright is the same length as the second right side upright, and is positioned in the container on the floor abutting the second right side upright, the right side horizontal component, the left side horizontal component, and the right side vertical component;

wherein the third left side upright is the same length as the second right side upright, and is positioned in the container on the floor abutting the second left side upright, the left side horizontal component, the right side horizontal component, and the left side vertical component.

16. The target stand kit of claim 15, further comprising a target positioned within the container, the target having edges configured to be removably secured to the target stand within the substantially continuous right side inwardly-facing groove and the substantially continuous left side inwardly-facing groove.

17. The target stand kit of claim 15, wherein the container is rectangular.

18. The target stand kit of claim 15 wherein the mating portion of the coupler of the first right side upright is curved, the mating portion of the coupler of the first left side upright is curved, the mating portion of the coupler of the second right side upright is curved, the mating portion of the coupler of the second left side upright is curved, the mating portion of the coupler of the third right side upright is curved, and the mating portion of the coupler of the third left side upright is curved.

19. The target stand kit of claim 18, wherein the base, the cover, the right side T-bar leg, the left side T-bar leg, the first right side upright, the first left side upright, the second right side upright, the second left side upright, the third right side upright, and third left side upright, comprise corrugated plastic.

20. The target stand of claim 15, further comprising fastening tape attached to the right side horizontal component, the floor along the right raised edge, the right raised edge, the left side horizontal component, the floor along the left raised edge, and the left raised edge;

wherein the fastening tape on the right horizontal component is positioned to mate with the fastening tape along the right raised edge and with the fastening tape on the floor along the right raised edge to thereby removably secure the right side horizontal component to the base; and wherein the fastening tape on the left horizontal component is positioned to mate with the fastening tape along the left raised edge and with the fastening tape on the floor along the left raised edge to thereby removably secure the left side horizontal component to the base.

* * * * *